US012800482B2

(12) United States Patent
Prystupa et al.

(10) Patent No.: US 12,800,482 B2
(45) Date of Patent: Nov. 17, 2026

(54) MULTIPATH ANALYZER FOR MEASURING OPTICAL PROPERTIES OF A SAMPLE FLUID TO OBTAIN AT LEAST ONE PROPERTY

(71) Applicant: 14911199 Canada Inc., CentrePort (CA)

(72) Inventors: David Allan Prystupa, Pinawa (CA); John Stephen Pacak, Winnipeg (CA)

(73) Assignee: 14911199 Canada Inc., CentrePort (CA)

( * ) Notice: Subject to any disclaimer, the term of this patent is extended or adjusted under 35 U.S.C. 154(b) by 48 days.

(21) Appl. No.: 18/627,909

(22) Filed: Apr. 5, 2024

(65) Prior Publication Data

US 2024/0337594 A1 Oct. 10, 2024

Related U.S. Application Data

(60) Provisional application No. 63/494,631, filed on Apr. 6, 2023.

(51) Int. Cl.
*G01N 21/31* (2006.01)
*G01N 21/21* (2006.01)
*G01N 21/64* (2006.01)

(52) U.S. Cl.
CPC ............. *G01N 21/31* (2013.01); *G01N 21/21* (2013.01); *G01N 21/6428* (2013.01)

(58) Field of Classification Search
CPC ..... G01N 2021/216; G01N 2021/4792; G01N 2021/651; G01N 2021/8416; G01N 21/031; G01N 21/0332; G01N 21/21; G01N 21/31; G01N 21/3577; G01N 21/51; G01N 21/6428; G01N 21/658; G01N 2201/0668;
(Continued)

(56) References Cited

U.S. PATENT DOCUMENTS 6,075,595 A 6/2000 Malinen
10,585,044 B2 3/2020 Prystupa
11,353,439 B2 6/2022 Prystupa
(Continued)

FOREIGN PATENT DOCUMENTS

WO WO2021163799 8/2021
WO WO2022020952 2/2022
(Continued)

*Primary Examiner* — Hina F Ayub
(74) *Attorney, Agent, or Firm* — Adrian D. Battison; Ryan W. Dupuis; Ade & Company Inc.

(57) ABSTRACT

A method for measuring optical properties of a sample fluid to obtain at least one property of the sample fluid includes adding a volume of a sample fluid to an enclosure. directing a plurality of electromagnetic radiation wavebands through the volume of sample fluid within the enclosure along a plurality of different paths to generate an interaction radiation for each waveband, measuring the amplitude of each interaction radiation and statistically analyzing the interaction radiation amplitudes to obtain at least one property of the sample fluid. In this method at least two different paths of the plurality of paths have different path lengths selected so that the absorption is between 0.1 and 1.0 absorbance units. Optionally at least one radiation waveband is linearly or circularly polarized and the amplitude measurement includes a polarization analyzer.

19 Claims, 2 Drawing Sheets

(58) Field of Classification Search
CPC ........... G01N 2201/129; G01N 33/143; G01N 33/146
See application file for complete search history.

(56) References Cited

U.S. PATENT DOCUMENTS

| | | | | |
|---|---|---|---|---|
| 2002/0071123 | A1 | 6/2002 | Miller et al. | |
| 2010/0079764 | A1 | 4/2010 | Spartz et al. | |
| 2010/0085571 | A1 | 4/2010 | Robertson, Jr. et al. | |
| 2020/0284654 | A1* | 9/2020 | Sabry | G01J 3/0262 |
| 2022/0170848 | A1 | 6/2022 | Prystupa et al. | |
| 2023/0098744 | A1* | 3/2023 | Seiwert | G01N 33/0039 436/135 |

FOREIGN PATENT DOCUMENTS

| | | |
|---|---|---|
| WO | WO2022109732 | 6/2022 |
| WO | WO2022115941 | 6/2022 |

* cited by examiner

MULTIPATH ANALYZER FOR MEASURING OPTICAL PROPERTIES OF A SAMPLE FLUID TO OBTAIN AT LEAST ONE PROPERTY

This application relates to a method for measuring optical properties of a sample fluid using a multipath analyzer to obtain at least one property of the sample fluid.

This disclosure is related to disclosures relating to a Method and Device for Bone Scan in Meat, hereafter "DBS patent" by the present inventors described in U.S. Pat. No. 11,353,439 issued Jun. 7, 2022. The disclosures of this patent are incorporated herein by reference. This application discloses a number of embodiments of LED spectroscopy where disclosures and improvements set out in the present application can find advantage.

Also, this disclosure is related to disclosures relating to High Efficiency Multiplex Spectroscopy, hereafter "HEMS patent" by the present inventors described in U.S. Pat. No. 10,585,044 issued Mar. 10, 2020. The disclosures of this patent are incorporated herein by reference. This application discloses a number of embodiments of multiplex spectroscopy where disclosures and improvements set out in the present application can find advantage.

Also, this disclosure is related to disclosures relating to Field Programmable Fluid Array, hereafter "FPFA patent" by the present inventors described in published PCT Application WO2021/163799 published 26 Aug. 2021 US patent application. This application discloses a number of embodiments of reconfigurable microfluidic arrays where disclosures and improvements set out in the present application can find advantage.

Also, this disclosure is related to disclosures relating to Multidimensional Spectroscopy of Macromolecules, hereafter "MDS patent" by the present inventors described in published PCT Application WO2022/020952 filed Jul. 28, 2021 and published 3 Feb. 2022 with earliest priority date Jul. 31, 2020. The disclosures of this application are incorporated herein by reference. This application discloses a number of embodiments of multidimensional spectroscopy where disclosures and improvements set out in the present application can find advantage.

Also, this disclosure is related to disclosures relating to Spectral Diagnostic System Algorithm, hereafter "SDS patent" by the present inventors described in published PCT Application WO2022/109732 filed Nov. 24, 2021 and published 2 Jun. 2022 with earliest priority date Nov. 26, 2020. The disclosures of this application are incorporated herein by reference. This application discloses a number of embodiments for temporal analysis of spectra where disclosures and improvements set out in the present application can find advantage.

Also, this disclosure is related to disclosures relating to Amplified Multiplex Absorption Spectroscopy, hereafter "AMAS patent" by the present inventors described in published PCT Application WO2022/115941 filed Nov. 24, 2021 and published 9 Jun. 2022 with earliest priority date Dec. 2, 2020. The disclosures of this application are incorporated herein by reference. This application discloses a number of embodiments of amplified multiplex spectroscopy where disclosures and improvements set out in the present application can find advantage.

BACKGROUND OF THE INVENTION

Absorbance due to a molecular species is proportional to concentration, path length, and absorption constants (transition dipole moments) dependent on the polarization of incident radiation relative to molecular orientation. For randomly oriented molecules, a single absorption constant is measured. The measured absorbance can be varied to optimize the signal-to-noise ratio of a particular spectral feature by adjusting the path length. Variable path length cells such as the White Cell, Heriot Cell, and numerous variants thereof are known in the art and commercially available. These variable path length cells admit one or more wavelengths of collimated probe radiation through an entrance aperture, pass radiation through an absorbing material multiple times with beam folding optics, and transmit potentially attenuated radiation to a detector (typically a spectrometer) for analysis. Miller et al describe a hollow fiber flow through cell with optical path length varied by optically coupling the hollow fiber to a common entrance and variable exit points along the fiber length in published US 2002/0071123 published Jun. 13, 2002. Malinen describes a LED spectrometer in U.S. Pat. No. 6,075,595 published Jun. 13, 2000 with a linear array of LED emitters in combination with a diffractive element and a focusing mirror arranged to project radiation from a selected LED through a slit. In the Malinen design, each activated LED passes a waveband narrower than the intrinsic waveband of the LED through the slit, thereby improving resolution. In the above cited DBS patent Prystupa describes a strobed LED and ultrasound method for detecting bone fragments on meat. In this arrangement, the broad spectral features of muscle, fat, and bone are commensurate with the spectral resolution afforded by LED sources and in this case the improved throughput is more beneficial than the improved spectral resolution given in the Malinen design. In all designs noted above, all wavelengths of probe radiation follow a common optical path and have the same path length. To make measurements for different path lengths, the optical configuration needs to be changed.

SUMMARY OF THE INVENTION

According to the invention there is provide a method for measuring optical properties of a sample fluid comprising:

- adding a first volume of sample fluid to an enclosed sample volume;
- directing a plurality of electromagnetic radiation wavebands through the first volume of sample fluid within the enclosed sample volume along a plurality of different paths to generate a first interaction radiation for each waveband;
- measuring the amplitude of each first interaction radiation at a common detector;
- statistically analyzing the first interaction radiation amplitudes to obtain at least one property of the sample fluid;
- wherein at least two of said plurality of different paths have different path lengths.

One object of the invention is to provide a method for measuring probe radiation traveling along a plurality of different path lengths without optical reconfiguration.

A second object of the invention is to provide a method which enables optimal path lengths to be used for different spectral regions containing strong and weak spectral features without the need for optical reconfiguration.

The arrangement as described in more detail hereinafter provides a multipath analyzer. The analyzer includes a control means, an enclosed sample volume, a plurality of electromagnetic radiation ports, and at least one electromagnetic radiation detection means. A sample material is transferred into the enclosed sample volume. The sample material may be any material that transmits probe radiation from a radiation port to a detection means along a path of known length. The probe radiation may suffer absorption or scattering characteristic of the sample material along the path length. Electromagnetic radiation is emitted at each radiation port, travels along an optical path distinct for each radiation port through the sample volume interacting with sample material to produce interaction radiation. Interaction radiation is directed to a radiation detection means. The electromagnetic radiation possibly suffers absorption and scattering along each distinct path. The amplitudes of radiation received at the detection means for each distinct path are analyzed to provide information about the sample material. Preferably the path length for each wavelength is selected to minimize the difference in measured signals. For example, a longer path length is selected for a first wavelength at which the sample material is weakly absorbing and a shorter path length is selected for a second wavelength at which the sample material is strongly absorbing. Preferably the path lengths for each wavelength are selected such that the absorbance is between 0.1 and 1.0 absorbance units. Most preferably the path lengths for each wavelength are selected such that the absorbance is about 0.5 absorbance units. This minimizes the dynamic range required for the detection means, allows greater signal amplification, and optimizes the signal to noise ratio (SNR).

In accordance with an important feature of the invention, there is provided a control means. The control means may include a computation means, a non-transient storage means, and a communication means. The control means may for example be a microprocessor, a field programmable gate array, a single board computer, a computer, a smart phone, or any device with similar functionality together with non transient operating code. The communication means may transmit and receive analog and digital signals to external and integral devices. The communication means may communicate with an integral display device that displays data. The communication means may communicate with a user input device, for example a touch screen or a keyboard. The communication means may communicate by wire or wirelessly signals to an external user interface. The communication means is in communication with the radiation detection means and may include circuitry operable to convert an analog signal from the detection means into a digital representation of the analog signal amplitude that may be stored in the storage means and analyzed by the computation means. The circuitry may for example include an analog to digital converter (ADC) and associated signal conditioning devices. The control means is in communication with each radiation port and generates signals that cause each radiation port to switch from an "off" state in which no radiation is emitted from the port to an "on" state in which radiation is emitted from the port. The control means may switch radiation ports between on states and off states in a temporal sequence. For each step in the temporal sequence, the control means sets each radiation port to a predetermined state and then receives analog signals from the detector means, converts the analog signal to digital form, and stores the digital amplitude of radiation corresponding to the state of the radiation ports. The temporal sequence may include a state in which all of the radiation ports are in the "off" state. The all "off" state measurement is used as a reference to compensate for the effects of ambient light and signal level offsets which may be inherent in amplification circuitry. The temporal sequence may switch each radiation input port to the "on" state one at a time and the detector means measures the corresponding radiation amplitude. Preferably the temporal sequence multiplexes the radiation input ports wherein different combinations of radiation input ports are in the "on" state for each step in the sequence and the detector means measures the corresponding radiation amplitudes for each combination. For example, if measurements for wavebands corresponding to three radiation ports A, B and C are required, the amplitudes of the combinations A+B, B+C, and C+A may be measured and the amplitudes of A, B and C may by calculated by solving a system of equations. The multiplex method improves the signal-to-noise ratio (SNR) relative to measuring A, B and C singly. Many multiplex schemes are possible. All that is required is that, for N radiation ports, N (or more) measurements are made with N different combinations of radiation ports and each radiation port is included in at least one combination of radiation ports. However, certain multiplex schemes give superior SNR. Notably Hadamard sequences are optimal for a single detector if the number of radiation ports is at or one less than a power of 2. For cases in which the number of radiation ports required is not close to a power of two, cyclic permutations of pseudo-random binary sequences may be used as discussed in the above referenced HEMS patent. In both cases a "1" in the sequence corresponds to a radiation port in the "on" state and a "0" in the sequence corresponds to a radiation port in the "off" state. The temporal sequence may include a plurality of sub-sequences wherein a first sub-sequence and a second sub-sequence consist of the same sequence of radiation port activation states and wherein at least one measurement condition differs between the first sub-sequence and the second sub-sequence. The measurement conditions changed may be the fill level or the temperature. For example, the measurement sequence may scan the same set of radiation ports (wavelength bands) for a series of different sample material temperatures to produce a two dimensional spectrum of radiation amplitudes dependent on wavelength along one axis and temperature along a second axis. For example, the measurement sequence may scan a set of radiation ports (wavelength bands) for a series of fill levels. The measured radiation amplitude for each radiation path depends on absorption by the fluid and interface effects. Changing the fill level alters the path length through the sample liquid for each of the plurality of radiation paths alters the fluid absorption while leaving the interface effects constant, thus allowing the interface effects to be removed in the following statistical analysis. The set of wavelength bands may be the same for each fill level or the set of wavelength bands may be different for at least two different fill levels. The radiation ports (wavelength bands) for each fill level are selected based on whether the expected amplitude of radiation received at the detector lies within a predetermined linear response range. Preferably the absorbance for each wavelength band included in measurements at each fill level is between 0.1 and 1.0 absorbance units. For example a sample material that interacts weakly with radiation from a particular radiation port may produce a signal at the detector dominated by noise and hence little or no diagnostic value. In this case the radiation port may be omitted from a measurement sequence at a low fill level, but may be included at a higher fill level where the SNR is better. Conversely a sample material that interacts strongly with radiation from a particular radiation port may saturate giving little or no change in detector signal with changing sample material composition at a high fill level. In this case the particular radiation port may be included in a measurement sub-sequence at a low fill level and excluded at a higher fill level corresponding to saturation. The computation means statistically compares the radiation amplitudes for a sequence of measurements of the sample material with radiation amplitudes for the same sequence of measurements of samples with known composition to infer at least one parameter relating to the composition of the sample material. As described in the above mentioned DBS patent, the data vector used for statistical analysis may be composed by appending amplitudes for different measurement conditions into a common vector for statistical analysis.

In accordance with an important feature of the invention, there is provided an enclosed sample volume. Preferably, the enclosed sample volume includes reflective surfaces shaped to direct electromagnetic radiation from each radiation input port along different paths to a common detection means. The enclosed sample volume may include at least one orifice for admitting (and removing) sample materials. The enclosed sample volume may include an input orifice and an output orifice wherein sample material is admitted through the input orifice and removed through the output orifice. In some embodiments the enclosed sample volume is an optical cell. In some embodiments, the enclosed sample volume is integral to a packaging container. The packaging container may for example be a box, bottle, can or flexible material such as a Tetra Pak.

In accordance with an important optional feature of the invention which can be used independently with any of the above or following features, the enclosed sample volume may include a gate or valve proximate to the output orifice operable to either allow or block flow through the orifice. In some embodiments the gate or valve is manually operated. In some embodiments the gate or valve may be in communication with the control means and operable to either allow or block flow according to signals generated by the control means. The control means may for example generate an analog voltage that controls a solenoid valve.

In accordance with an important optional feature of the invention which can be used independently with any of the above or following features, the enclosed sample volume may include a sample level measurement means in communication with the control means operable to measure the quantify of sample material in the enclosed sample volume. Any type of sample material level detection method such as optical, capacitance, ultrasound, a float with magnetic position detection or other known in the art may be used. The sample level measurement means may for example include a collimated light source that directs light at an angle toward the optical interface between sample material within the enclosed sample volume and non-sample material (normally air). Light reflected at the optical interface is detected by a position sensitive detector, which may be a photodiode array, and the position is processed by the control means to calculate a value indicative of the sample level. The sample level measurement means may for example consist of an acoustic transmitter and receiver in communication with the control means wherein the control means generates electric signals that cause acoustic waves to be emitted in a temporal sequence by the transmitter, the acoustic waves travel to one or more sample material interfaces where reflection occurs and the receiver (which may also be the transmitter) generates a sequence of electrical signals that are processed by the control means to obtain the sample material level based on the temporal delay between transmitted and received acoustic waves. The sample measurement means may for example measure the electrical capacitance between surfaces of the enclosed sample volume and the control means infers the sample material level by changes in capacitance. In some embodiments, the enclosed sample volume may include a window with a sequence of indicator marks (similar to a graduated cylinder) and the level may be read manually and then input via an input device to the control means.

In accordance with an important optional feature of the invention which can be used independently with any of the above or following features, a tilt angle detection means is provided. The tilt angle detection means is operable to measure the angle between the normal to a predetermined bounding surface of the enclosed sample volume and the direction of gravity. If the sample material does not occupy the entire enclosed sample volume, the equilibrium sample material surface is generally perpendicular to the direction of gravity. The orientation of the sample material surface relative to transmissive and reflective surfaces determines the optical path length from each radiation port to the detection means that passes through the sample material. In some embodiments, the tilt angle detection means may be inspected manually, for example with a bubble level and the orientation of the multipath analyzer relative is adjusted manually (for example with threaded support legs) until the tilt angle is within a predetermined tolerance for measurement. This leveling procedure adjusts path lengths through the sample material to predetermined standard path lengths within a predetermined tolerance. In some embodiments, the tilt angle measurement means is in communication with the control means and the control means calculates the length of each optical path through the sample based on the tilt angle and the geometry of reflective and transmissive surfaces. This embodiment is useful for applications in which the orientation changes dynamically, for example on a ship subject to wave motion.

In accordance with an important optional feature of the invention which can be used independently with any of the above or following features, a sample material injection means is provided. Any type of sample material injection method may be used. The sample material injection means may for example be a syringe, eye dropper, flexible ampoule, pipette, capsule or other injection device that interfaces with an orifice in the enclosed sample volume. A syringe may for example be loaded with a liquid sample material externally, the syringe is subsequently attached to a fixture proximate to the orifice in the enclosed sample volume and the sample material is injected through the orifice by translating the syringe plunger. The plunger may be translated manually or mechanically, for example with a solenoid controlled by the control means. The sample injection means may for example include a reservoir chamber in communication with the enclosed sample volume and a means to exert pressure within the reservoir chamber so as to transfer fluid from the reservoir chamber to the enclosed sample volume at a controllable rate. The fluid may be a gas or a liquid. The means to exert pressure may for example be a solenoid attached to a piston, a peristaltic pump, a rotary pump, or a compressed gas. In some embodiments the enclosed sample volume; reservoir chamber; and sample injection means may be elements of microfluidic network as described in the above cited FPFA patent. Preferably the microfluidic network includes integral light pipes or fiber optics that interface with external light sources and a detector.

In accordance with an important optional feature of the invention which can be used independently with any of the above or following features, a temperature control means is placed in thermal communication with the enclosed sample volume. The temperature control means may include a temperature sensor, a heating means and a cooling means. The temperature control means may be in communication with the control means. The temperature sensor may transmit signals to the control means indicative of temperature and the control means may transmit analog or digital signals to the heating means and/or cooling means operating in combination to regulate the temperature via a feedback loop in the enclosed sample volume to a predetermined temperature. The heating means may for example be a resistive element that generates heat when an electric current is passed through. The cooling means may for example be a thermoelectric cooler. In some embodiments, the control means may vary the temperature in a predetermined sequence and activate a sequence of radiation ports so as to make measurements at each temperature in the sequence.

In accordance with an important optional feature of the invention which can be used independently with any of the above or following features, the enclosed sample volume may be integral to a cartridge that attaches to the analyzer, wherein the cartridge includes transparent window regions that admit electromagnetic radiation from at least some radiation ports and transmit electromagnetic radiation to the detector means. The cartridge may be pre-filled externally with the sample material. The cartridge may include reflective surfaces that direct electromagnetic radiation along different paths for each input ports to the common detector. The analysis cell may accept different types of cartridges wherein at least one optical path length from at least one radiation input port differs between different cartridge types. The cartridge may include an electrical or optical code readable by the control means that indicates the cartridge type and optionally includes sample information. In some embodiments the features of the cartridge are integral to a packaging container.

In accordance with an important optional feature of the invention which can be used independently with any of the above or following features, the enclosed sample volume may be bounded by at least one reflective surface that functions to reflect radiation from at least one radiation port toward a detector means. In some embodiments the enclosed sample volume is bounded by at least two opposed reflective surfaces and radiation from at least one radiation port is reflected from a first reflective surface to a second reflective surface at least once before being directed to a detector means. In some embodiments, at least one reflective surface is curved to direct and focus radiation.

In accordance with an important optional feature of the invention which can be used independently with any of the above or following features, at least one platform reflective surface is positioned at a location intermediate between two bounding surfaces within the bulk of the enclosed sample volume. The platform reflective surface may be positioned to reflect radiation transmitted through a transmissive region of a bounding surface corresponding to a radiation port. The platform reflective surface may additionally be positioned to reflect radiation toward a transmissive region of a bounding surface proximate to a detector means. Preferably the platform reflective surface is shaped and sized such that there is at least one path for sample material to flow from any first point within the enclosed sample volume to any second point within the enclosed sample volume. For example, if the platform reflective surface is positioned at a height between the top and bottom of a rectangular container, the width and/or length of the platform reflective surface is less than the width and/or length of the rectangular container. For example, the platform reflective surface may include one or more apertures at locations that are not part of an optical measurement path. In some embodiments the platform reflective surface is mechanically attached to a bounding surface generally perpendicular to the platform reflective surface. In this case the attachment point is at a predetermined distance from a bounding surface with transmissive regions proximate or integral to radiation ports. In some embodiments the platform reflective surface is mechanically attached to an opposed bounding surface with transmissive regions proximate or integral to radiation ports. For example the top surface of a container may include transmissive regions proximate to radiation ports and the platform reflective surface is vertically displaced from the top surface and mechanically attached to the top surface. In some embodiments, the bounding surface with transmissive regions proximate or integral to at least one radiation port is displaced from the platform reflective surface with at least one spacer that mechanically links the bounding surface and platform reflective surface to form a unitary optical module. The unitary optical module may include a plurality of optical paths from a plurality of radiation ports directed toward and terminating at a detector means wherein the path lengths are different. For example, different types of unitary optical modules may be fabricated wherein each type includes a different set of standard optical path lengths. An end user may select the type with the set of optical path lengths that most closely correspond with measurement requirements for a particular sample material. For example the end user may select a first type of unitary optical module for use with a package containing wine and a second type of unitary optical module for use with a package containing spirits. In some embodiments the unitary optical module is integral with a packaging container. In some embodiments the unitary optical module is inserted into or added to a packaging container for the purpose of measurement.

In accordance with an important optional feature of the invention which can be used independently with any of the above or following features, at least one region of a surface bounding the enclosed sample volume includes a material that enhances Raman scattering for at least one type of molecule present or suspected to be present in the sample material proximate to the surface region-surface enhanced Raman scattering (SERS). Suitable materials include Au, Ag and Pt.

In accordance with an important feature of the invention, there is provided a plurality of electromagnetic radiation ports in optical communication with the enclosed sample volume. Preferably each radiation input port includes a collimation means that at least partially collimates radiation supplied by the radiation port. Optionally, each radiation port includes a polarizing means that functions to linearly or circularly polarize radiation emitted through the port. Each electromagnetic radiation port is associated with a wavelength distribution of amplitudes in a range of wavelengths of electromagnetic radiation that may be emitted into the enclosed sample volume and an optical path length from the radiation port to a common radiation detection means. At least two radiation ports have different associated optical path lengths. This feature enables the path length to set to a value that best uses the dynamic range of the detector to optimize the signal-to-noise ratio (SNR). This is useful for measuring samples with known chemical constituents at unknown concentrations. Preferably, longer path lengths are selected for radiation ports emitting at wavelengths corresponding to weakly absorbing spectral features and shorter path lengths are selected for radiation ports emitting at wavelengths corresponding to strongly absorbing spectral features. At least two radiation ports have different associated wavelength distributions of amplitude or polarization. In some embodiments the distribution of wavelength amplitudes is different for all radiation ports. In some embodiments a plurality of radiation ports may have the same wavelength distribution of amplitudes and different associated optical path lengths. In some embodiments a plurality of radiation ports may have the same wavelength distribution of amplitudes and different polarization states. In some embodiments, all of the radiation ports have different associated optical path lengths and different wavelength distributions of amplitude. The radiation ports are in communication with the control means. The control means generates signals that cause the electromagnetic radiation ports to either emit or not emit radiation into the enclosed sample volume in accordance with a predetermined temporal sequence. The electromagnetic radiation ports may for example be the surfaces of LED light sources. The electromagnetic radiation ports may for example be light pipes, waveguides or fiber optics conveying radiation from a remote light source. The remote light source may for example be a LED, a laser, a thermal radiation source, or a monochromator that directs selected wavelengths from a broadband source to the radiation port.

In accordance with an important feature of the invention, there is provided an electromagnetic radiation detection means. The detection means is in communication with a control means. The radiation detection means may for example be a photoelectric device such as a photodiode together with associated amplification and signal conditioning circuitry or a photo-thermal device such as a thermopile or bolometer together with associated amplification and signal conditioning circuitry. The radiation detection means may optionally include a polarization analyzer. The radiation detection means may optionally include a cooling means such as a thermoelectric cooler or a member in contact with a cryogenic fluid. The cooling means functions to reduce thermal noise in the detected signal. The radiation detection means is operable to produce an analog signal proportional to the total amplitude of radiation received within the wavelength ranges emitted by the radiation ports. The radiation detection means may be a spectrometer. Preferably the spectrometer is of the type described in the above cited HEMS patent.

In accordance with an important feature of the invention, there is provided an optical adapter means that functions to direct radiation from radiation ports into an enclosed sample volume along predetermined paths and to direct interaction radiation from the enclosed sample volume to a radiation detection means wherein the enclosed sample volume is integral to a packaging container. The optical adapter means may for example be a gel that matches the refractive index of transparent packaging material. The optical adapter may be shaped as a lens to focus or collimate radiation. The optical adapter may be shaped to function as a flat window with features to correct for curvature in the packaging material.

The features of the multipath analyzer described herein may be configured as devices suited for each sample material type and application context.

In some embodiments the multipath analyzer is configured as a device to measure the composition of sample materials such as fruit juices and alcoholic beverages derived from fruit juices such as wine and cider. Different multipath analyzer devices may be configured to test the chemical composition during production, during storage, and at the time of consumption. During production, raw ingredients, often from natural sources (ie fruit) are added to a process container. The raw ingredients may have different concentrations of major constituents such as sugars, starches, lipids and proteins as well as numerous minor organic and inorganic constituents present at lower concentrations depending on the time and location of harvest. During the production process it may be desirable to bring the concentrations of major constituents to standard concentrations of each by blending ingredients from natural sources and by adding purified constituents as required. Hence a method for measuring the chemical composition is required.

In some embodiments the multipath analyzer may be configured with a broadband mid infrared radiation source (wavelengths from about 2 microns to 50 microns) emitting radiation sequentially along different path lengths ranging from about 5 microns to about 100 microns or more toward a common detector means. In this embodiment, the multipath analyzer may be integral to the microfluidic array described in the FPFA patent cited above by the current inventors. Preferably the detection means is a spectrometer and most preferably the spectrometer described in the HEMS patent cited above by the current inventors. The multipath concept described in the present disclosure optimizes the optical path length for each measured constituent (setting the absorbance between 0.1 and 1.0 absorbance units, preferably about 0.5 absorbance units) and the HEMS technology optimizes the photonic efficiency. The combination improves the SNR achievable and hence the precision and accuracy of chemical concentrations derived from the resulting spectra. Major constituents such as glucose, fructose, maltose, amylose, amylopectin, gross protein, lipid and DNA may be extracted from the spectra with multivariate statistical methods, including for example PCA.

In some embodiments the multipath analyzer may be configured with a broadband mid infrared radiation source (wavelengths from about 2 microns to 50 microns) emitting radiation sequentially along different path lengths ranging from about 5 microns to about 100 microns or more toward a common detector means. In this embodiment, the multipath analyzer may be integral to the microfluidic array described in the FPFA patent cited above by the current inventors. Preferably the detection means is a spectrometer and most preferably the spectrometer described in the HEMS patent cited above. In some embodiments the free spectral range of the spectrometer matches the spectral range of broadband radiation.

In some embodiments the multipath analyzer may be configured with a different narrow band radiation source (such as a LED) for each path and radiation port directed toward a common detector means. In this embodiment, the multipath analyzer may be integral to the micro-fluidic array described in the FPFA patent cited above by the current inventors. Preferably the detection means is a spectrometer and most preferably the spectrometer described in the HEMS patent cited above. In this embodiment the free spectral range of the spectrometer matches the spectral width of each narrow band source of radiation and the spectrometer is sequentially tuned to each source waveband by changing the orientation of a dispersive element such as a grating or prism. This approach allows greater spectral resolution, which may be advantageous for measuring the rotational bands of vapor phase samples.

The multipath concept described in the present disclosure optimizes the optical path length for each measured constituent (setting the absorbance between 0.1 and 1.0 absorbance units, preferably about 0.5 absorbance units) and the HEMS technology optimizes the photonic efficiency. The combination improves the SNR achievable and hence the precision and accuracy of chemical concentrations derived from the resulting spectra. Major constituents such as glucose, fructose, maltose, amylose, amylopectin, gross protein, lipid and DNA may be extracted from the spectra with multivariate statistical methods, including for example PCA.

In some embodiments, the multipath analyzer further includes features described in the MDS patent referenced above. The MDS method applies electromagnetic and acoustic perturbations to sample materials and measures the resonant spectral response. This enables a device so equipped to further distinguish between biopolymers with different molecular weight, and different conformations. In some embodiments, the multipath analyzer is combined with the arrangement described in the AMAS patent referenced above by the current inventors. Specifically different optical path lengths in the AMAS patent are achieved with multiple radiation ports in the current disclosure rather than by reconfiguring optical components. Methods described in the AMAS patent are suitable for measuring spectra of microbes at concentrations as low as a single cell (or virus). This embodiment may be used for example to detect and classify to species level fungi, yeast, bacteria or virus species present in natural ingredients that may either enhance or contaminate a natural product. Production may include a pasteurization step. In this case the methods described above may be used to check for microbial contamination following pasteurization. Non-viable organisms may be distinguished from viable organisms via spectral signatures associated with cytoplasm oxidation. Production may include a fermentation step, for example from must to wine. The concentrations of derivative products such as ethanol, methanol, lactic acid, malic acid, tartaric acid, citric acid, as well as feedstock chemical species noted above change with time. The number and type of microbes such as yeast and bacteria also change with time. The multipath analyzer may be used to monitor temporal changes in a process container enabling an operator to alter the process conditions to achieve a desired end product. The process may include addition of sulfur dioxide as a derivative product of fermentation or as a pure chemical. The concentration of resulting sulfites may be monitored by the multipath analyzer. Algorithms described in the SDS patent cited above by the current inventors may be used to analyze measurement data from the multipath analyzer to infer the presence of microbial activity via temporal dependencies.

In some embodiments the multipath analyzer is configured to measure the composition of a product in a container during storage. The multipath analyzer may be configured to excite Raman spectra with multiple wavelengths wherein the path length for each is selected to equalize the spectral signal amplitudes and the detection means is a spectrometer. At excitation frequencies off resonance, the Raman scattering amplitude varies as the fourth power of excitation frequency. However at short excitation wavelengths, broad fluorescence emission may be stronger than Raman scattering and mask the desired Raman spectrum for some molecules, including those of particular interest for the wine and fruit juice applications envisioned for the present invention. Multiple wavelength excitation may be used to mitigate the effect of fluorescence. Spectral subtraction methods are known in the art to remove spectral interference from fluorescence by comparing spectra exited with different wavelengths and performing spectral subtraction. However the spectral subtraction procedure may amplify noise. The current invention provides a method to scale spectra during the measurement, which gives equal weight to noise in the spectrum for each wavelength, thereby providing a more reliable result. In some embodiments, the multipath analyzer ports are configured to emit near infrared radiation in specific wavebands. In these embodiments, a sample material such as wine or fruit juice may be examined through a packaging material such as glass and tested for quality parameters and spoilage. Preferably the packaging material incorporates the cartridge concept described above.

In some embodiments, the multipath analyzer is configured to perform simple tests such as ethanol content in the field. The multipath analyzer may for example be used to measure the ethanol concentration in an alcoholic beverage such as wine, beer or spirits. The multipath analyzer may for example be used as a breathalyzer to measure the ethanol content in breath. For this embodiment, the radiation ports are preferably LED's. At least one LED radiation port with emission center near 1300 nm (maximizing the difference in absorption between ethanol and water) and at least one LED radiation port with emission near 1050 nm (minimizing the difference in absorption between ethanol and water) may be included. In some embodiments LED radiation ports are included with wavebands corresponding to overtone bands of other major constituents such as sugars and organic acids. In some embodiments the radiation ports may include visible wavelength LED's at wavebands between 400 nm and 800 nm that are used to access the color and visual appearance of a sample fluid such as wine. The radiation ports may for example include UV LEDs with wavebands absorbed by anthocyanin compounds. In some embodiments, two radiation ports with different path lengths emit the same waveband for which scattering dominates and the temporal fluctuations in apparent absorbance are analyzed to infer turbidity.

The arrangement herein is particularly useful for analysis of constituents of wine including selected ones or all of the following:

- Sulphur compounds i.e. Mercaptans, sulphur dioxide, hydrogen sulfide, etc.
- Volatile acidity (VA) (i.e. Acetal acid, Ethyl acetate etc.)
- Diacetyl
- *Acetobacter* (acetic acid bacteria)
- Acetaldehyde
- Methanethiol
- Oxidized
- Reduced
- Protein instability (protein haze)
- Turbidity
- Lactic Acid Bacteria
- Geranium (lactic acid bacteria and potassium sorbate)
- Brettanomyces and dekkera (and other yeasts)
- 2,4,6 Trichloroanisole (TCA)-Cork Taint
- Microbial bacterial taint i.e. mousiness (produced by a number of lactic acid bacteria as well as Brettanomyces and dekkera yeasts)
- Lightstrike (UV damaged)
- Heat damaged/maderized
- Bacteria such as *Pediococcus, lactobacillus*
- *Fusarium* sp.—*Fusarium oxysporum* (*Fusarium* wilt) Note: High producer of 2,4,6 Trichloroanisole
- Butyric Acid
- Anthocyanins
- Phenolics and polyphenolics
- Acids (especially Lactic acid, malic acid, tartaric and citric)
- Methoxypyrazine
- Colour
- Sugars
- Aromatic compounds Flavonoids
pH
Yeasts such as *Saccharomyces cerevisiae*
Alcohols such as ethanol and methanol Other systems such as High Performance Liquid Chromatography (HPLC), Mass Spectroscopy, Elisa may be able to obtain data on one or more of the above. However the present invention provides a simple, low cost effective system for detecting levels of selected ones of the above. This can be done in the present system in situ at the sample or at the container of the material in a non-destructive manner. The system is thus effective for monitoring changes of the selected materials or conditions over time.

The present system is particularly effective for detecting bacteria and particularly the above stated bacteria in situ and on a real time basis without the necessity for culturing.

DETAILED DESCRIPTION

Figure 1:
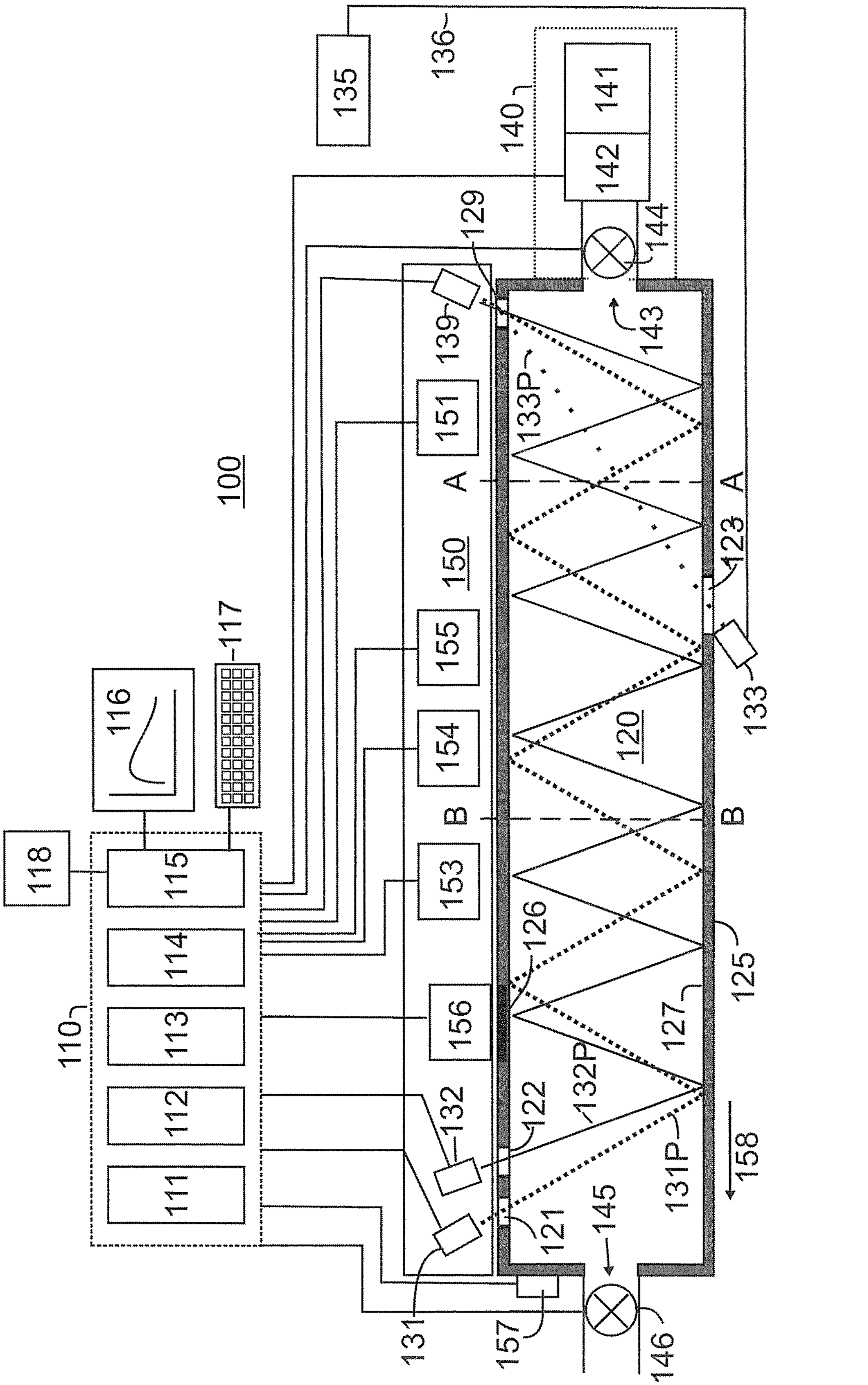
FIG. 1 shows a schematic drawing of the multipath analyzer according to the invention.

A schematic illustration of the invention is generally indicated at 100. Control means 110 includes a computation device 111, non-transitory information storage means 112, analog input port 113, analog output port 114 and communication port 115. Communication port 115 may communicate with a user display device 116, a user IO device 117 and an external network 118. In some embodiments user display device 116, user IO device 117 and network 118 are contained in a common package such as a smart phone.

The enclosed sample volume is indicated at 120 with walls 125 and a reflective inner surface as indicated at 127. Enclosed sample volume may include transparent sections 121, 122, and 123 that transmit radiation from radiation ports 131, 132 and 133 with different optical paths 131P, 132P and 133P, respectively to detection means 139 with transparent window 129. Three radiation ports are shown for illustrative purposes only. Any number of radiation ports may be used within the scope of the invention.

In some embodiments the enclosed sample volume is a cartridge defined by the walls 125 with transparent window sections 121, 122, 123 and 129. The cartridge may include encoded information means 126 that may be optical, electronic, or a combination of optical and electronic. The encoded information means may for example include information about the sample material and the configuration of radiation port windows, the optical paths associated with each, and the detector means window. The multipath analyzer may include a means to read the encoded information 156 in communication with control means 110. The walls 125 include a reflective inner surface 127. The walls may be curved so as to focus and direct radiation along predefined paths.

In some embodiments the cartridge is pre-loaded with sample material and sealed. The sample material may be any material that transmits probe radiation from a radiation port to a detection means along a path of known length. The sample material may for example be an industrial chemical, a polymer, or a beverage such as fruit juice, wine, spirits or beer. In this case, the cartridge may have similar dimensions to standard packaging such as a can, bottle or flexible material i.e. Tetra Pak (trade mark), differing from the standard package by the addition of optical windows and other features discussed herein. In some embodiments, the standard packaging such as a bottle includes an optically transparent region and an optical adapter means (not shown) may be temporarily added to direct radiation into and out of the packaging along predefined paths. The optical adapter means may for example be a gel that matches the refractive index of the transparent packaging material. The optical adapter may be shaped as a lens to focus or collimate radiation. The optical adapter may be shaped to function as a flat window with features to correct for curvature in the packaging material. The multipath analyzer measures optical properties of the sample material along different paths and statistically analyzes the measured optical properties to obtain information related to a quality parameter of the sample material. The quality parameter may for example be indicative of flavor or spoilage. Control means communicates the quality parameter to a user and the user may decide to either retain or dispose of a cartridge based at least in part on the quality parameter.

In some embodiments, the cartridge is initially empty and includes ports for adding sample material. In this embodiment, the cartridge is disposable, eliminating the need to clean the enclosed sample volume between measuring different sample materials.

The cartridge may be inserted into a module 150 that holds radiation ports, the radiation detection means, and other features discussed below in fixed relation to corresponding windows on the cartridge.

In some embodiments the module 150 and the walls enclosed sample volume walls 125 correspond to the same material: that is the configuration is permanent and there is no removable cartridge.

Radiation ports 131, 132, and 133 are in communication with control means 110 operable to activate or deactivate each radiation port in a temporal sequence. In some embodiments radiation ports are activated singly. In some embodiments, the radiation ports are multiplexed: that is different combinations of radiation ports are activated in a temporal sequence and the contribution of radiation from each radiation port to the measured amplitude at detection means 139 is determined by solving a system of equations. The amplitudes for the radiation ports may be analyzed statistically to infer one or more quality parameters of the sample material in the enclosed sample volume. Alternately, the multiplexed amplitudes may be analyzed statistically to infer one or more quality parameters of the sample material in the enclosed sample volume.

In some embodiments electromagnetic radiation at specified wavelengths or ranges of wavelengths is introduced to enclosed sample volume 120 along defined paths and the absorbance by sample material at the specified wavelengths is measured.

In some embodiments quasi-monochromatic excitation radiation at a specified wavelength is introduced at each radiation port 121, 122, 123 into sample volume 120, wherein the specified wavelength is different at each port, and Raman scattered radiation at wavelengths different from the excitation wavelengths is measured. Because the Raman scattering amplitude scales as the fourth power of frequency, it is advantageous to assign radiation ports corresponding to shorter path lengths to shorter wavelength excitation radiation and radiation ports corresponding to longer path lengths to longer wavelength excitation radiation. In some embodiments reflective walls 127 may include regions along specified paths lined with materials that excite surface enhanced Raman scattering (SERS). The materials are known to those skilled in the art and are commercially available. Examples include Au, Ag, and Pt where the material is colloidal with random dimensions or the material has per-determined dimensions the correspond to a specified surface plasmon resonance. As the paths 131P, 132P, and 133P intersect reflective walls 127 at different locations, different SERS materials may be added at locations specific to each path to selectively enhance Raman signals from selected vibrational modes of molecules known or suspected to be in the sample material. In some embodiments the excitation radiation excites resonance Raman scattering from selected modes of molecules known or suspected to be in the sample material.

In some embodiments radiation ports 121, 122 and 123 may emit radiation at the same wavelength distribution and different polarization states into sample volume 120. Detector 139 may include a polarizing filter (not shown) to measure the amplitude of Raman scattered radiation in different polarization states. Hence two or more radiation ports can be used to measure the depolarization ratio of an unordered sample fluid. Detector 139 with included polarizing filter (not shown) may measure the amplitude of radiation transmitted with different polarizing states through an ordered fluid or a chiral fluid to infer information about fluid parameters. An ordered fluid may for example be a liquid crystal or contain biopolymers oriented by flow. A chiral fluid may for example contain sugars.

Reflective walls 127 are shaped to direct radiation along paths 131P, 132P and 133P. Reflective walls 127 may include regions curved to focus or collimate electromagnetic radiation. Radiation ports 131, 132, and 133 preferably include optical elements such as lenses and mirrors that function to collimate electromagnetic radiation and to direct said collimated radiation along a predetermined path within the enclosed sample volume 120. In some embodiments, radiation ports 131, 132, and 133 are LEDs and the collimating optical element is integral to each LED. In some embodiments, the full band width of the LED is emitted into the enclosed sample volume 120. In some embodiments, at least one optical port includes a band pass filter that operates to attenuate at least one wavelength. In some embodiments, at least one optical port includes a polarizer that operates to linearly or circularly polarize at least one wavelength.

In some embodiments, radiation source 137, in response to control signals from control means 110, generates radiation at specified wavelengths or ranges of wavelengths and the radiation is transmitted by a wave guide 136 to radiation port 133. None, some or all radiation ports may be in communication with a radiation source 137 within the scope of the invention. In some embodiments (not shown) a single radiation source 137 is in communication with a plurality of radiation ports. In some embodiments (not shown) a separate radiation source 137 is in communication with each radiation port. In some embodiments, a radiation source such as a LED is integral to a radiation port. Radiation source 137 may for example include a monochromator that selects a range of wavelengths from a broadband emitter such as a flash lamp or a thermal emitter. Radiation source 137 may for example include an interferometer that alters phase relationships between different wavelengths in the output beam in a controlled sequence as in a Fourier Transform spectrometer. Radiation source 137 may for example encode radiation of different wavelengths in a Hadamard sequence.

In some embodiments detection means 139 may be an optical power detector that communicates the amplitude of incident electromagnetic radiation to control means 110. Detection means may for example be a photodiode or a bolometer or a thermopile. Preferably detection means 139 includes signal conditioning circuitry that amplifies, filters and offsets a detector voltage and outputs a voltage signal within a predetermined range to the control means 110. Control means 110 may include one or more analog to digital converters (ADC) to digitize analog signals.

In some embodiments detection means 139 may be a spectrometer that operates to determine the amplitude of radiation at a plurality of wavelengths. Preferably the spectrometer is of the type described in the above cited HEMS patent by the current inventors. Other types of spectrometers may be used.

Temperature measuring device 153 senses the temperature in enclosed sample volume 120 and sends a voltage signal to control means 110. The voltage signal may be an analog voltage that control means processes to determine a temperature. The voltage signal may be a sequence of logical voltage states that control means 110 interprets as a temperature. Control means 110 activates cooling means schematically shown at 154 and heating means schematically shown at 155 to regulate the temperature in enclosed sample volume 120 to a predetermined measurement temperature. The cooling means 154 and heating means 155 may be embedded in thermally conductive material (not shown) in contact with the reflective surfaces 121. In some embodiments, a single measurement temperature within enclosed sample volume 120 is set. In other embodiments, enclosed sample volume 120 is set to a sequence of different measurement temperatures. Cooling means 154 may for example be a Peltier cooler. Heating means 155 may for example be a resistive material that generates heat when electric current flows through the material.

The multipath analyzer may include sample injection means 140. In some embodiments, sample injection means 140 may be a syringe, eye dropper, flexible ampoule, pipette, or capsule. In some embodiments, sample injection means 140 includes a reservoir of sample material 141 and a pumping means 142 operable to transfer sample material from reservoir 141 to the enclosed sample volume 120 through input orifice 143. In some embodiments pumping means 142 may be in communication with and activated by control means 120. In other embodiments pumping means 142 may by manually operated by a user. Pumping means 142 may for example be a rotary pump, a peristaltic pump, or a piston. The piston may for example be operated manually by a user or automatically with a solenoid responding to control signals from control means 110. Sample injection means 140 may optionally include a valve 144 that either allows or blocks the flow of a sample material from reservoir 141 to enclosed sample volume 120.

In some embodiments enclosed sample volume 120 may be configured as a flow through cell by inclusion of output orifice 145. Output orifice may include a valve 146. In some embodiments valve 146 is in communication with control means 110 which generates control signals causing a motor (not shown) to open or close the valve. In some embodiments valve 146 may be operated manually by a user.

In some embodiments the multipath analyzer includes a sample level measurement means indicated at 157. The sample level measurement means may communicate with control means 110. The sample measurement means is operable to measure the distance from a reference point such as the indicated location 157 to the interface between a liquid sample material and air. The multipath analyzer is oriented such that the interface is generally parallel to the line A-A and perpendicular to the enclosed sample volume axis indicated at 158. In some embodiments, the analyzer is oriented such that axis 158 is in the same direction as gravity as indicated by tilt angle detection means 151. Tilt angle detection means 151 may optionally be in communication with control means 110. Control means 110 calculates optical path lengths through the sample material based on the measured tilt angle. In some embodiments such as a capillary, surface tension is sufficient to orient the air-sample interface. The interface at increasing fill levels is shown at the lines A-A and B-B. The sample level measurement means may for example infer the fill level by directing collimated probe light toward the interface at an angle of incidence and measuring the position of reflected light. The sample level measurement means may for example emit acoustic waves and measure the return time from the interface. The sample level measurement means may for example measure the capacitance between opposed surfaces of the enclosed sample volume and infer the fill level using prior knowledge of the sample material dielectric constant, which may be stored in non-volatile memory in the control means. In some embodiments, the level measurement means may include a reference cell containing the sample material with known dimensions and a capacitance measurement is made. This implicitly gives the dielectric constant of the sample material. The fill level can be determined by the ratio of capacitance between the reference cell and the capacitance of the enclosed sample volume.

The multipath analyzer makes measurements by emitting electromagnetic radiation of known spectral content from the radiation ports (131, 132, and 133) in a temporal sequence and measuring the amplitude of interaction radiation received for each step in the sequence with the detection means. In some embodiments control means 110 receives signals from sample level measurement means 157 as sample material is being added and uses the sample level to calculate the path length through the sample material from each radiation port (131, 132, and 133) to detection means 134. The control means 110 may generate signals to initiate data collection at a set of predetermined fill levels, for example the lines A-A and B-B. In embodiments where the detection means is a photodiode, a complete data acquisition cycle may for example be executed in a few milliseconds or less. The time required to fill the enclosed sample volume with sample material may be several seconds. Even if the sample material is injected manually with a syringe at a non-uniform rate, the measurements can be triggered at a series of predetermined fill levels based on measurements from the fill level means 157. In some embodiments, control 110 regulates the fill rate by generating signals to pump means 144 based on feedback from fill level means 157. This enables sample materials with different viscosity to be transferred into the enclosed sample volume 120 at a uniform rate. By measuring the amplitude of radiation received at the detection means for a plurality of fill levels (and corresponding path lengths), the effect of interface effects on measured amplitudes can be removed.

Figure 2:
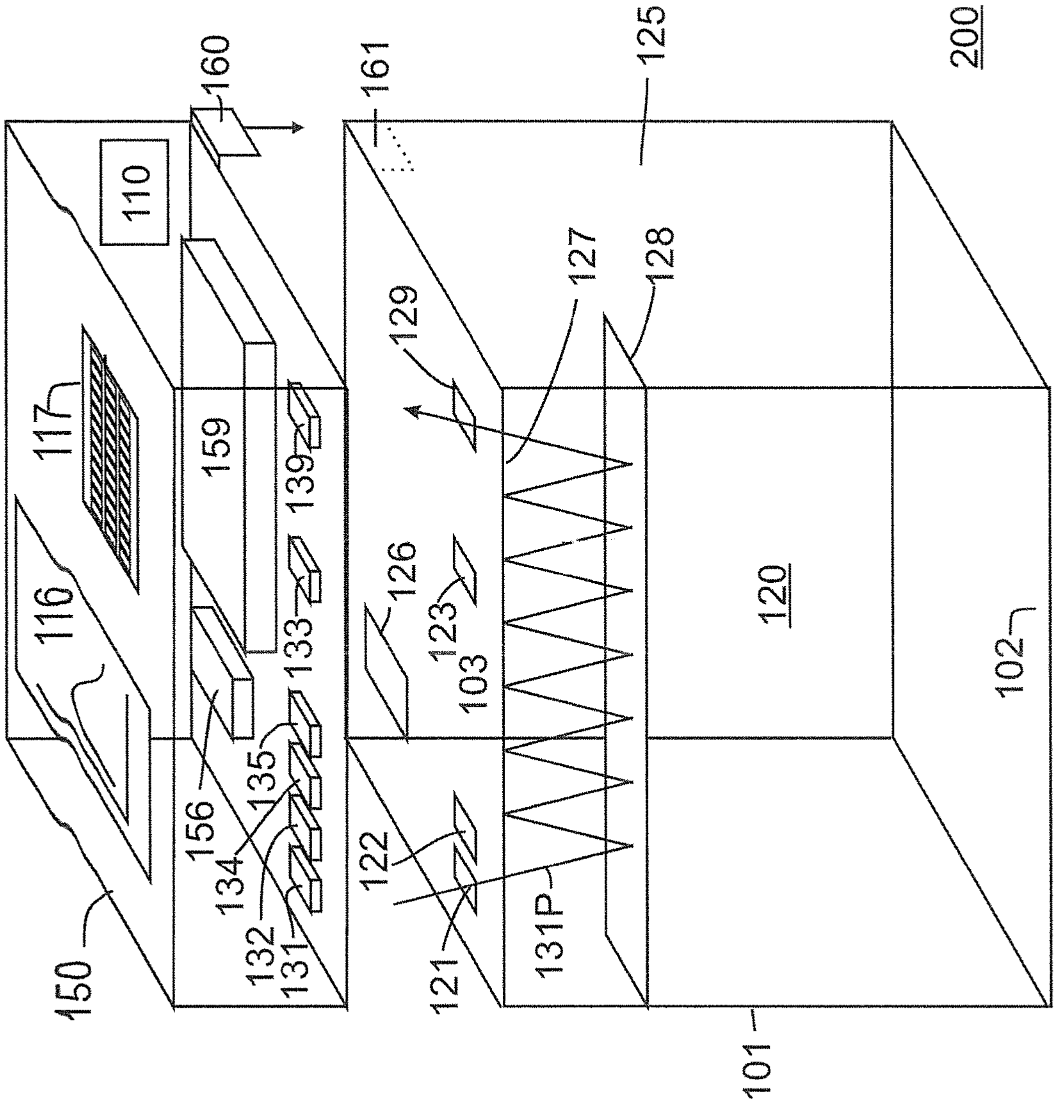
FIG. 2 shows a cartridge embodiment of the multipath analyzer.

FIG. 2 shows a cartridge embodiment of the multipath analyzer generally indicated at 200 consisting of module 150 and cartridge 101. Module 150 has radiation ports 131, 132, 133, 134, and 135 which each may emit a different range of wavelengths. The radiation ports are in communication with control means shown schematically at 110. Some embodiments may have fewer radiation ports and some embodiments may have more radiation ports. The radiation ports may for example be LEDs with different central wavelengths. The radiation ports may for example be LEDs with a plurality of peak emission wavelengths. The radiation ports may for example be lasers. The radiation ports may for example be linked via light pipes or other suitable transfer optics with a light box (not shown). The light box may contain a broadband radiation source, a dispersive element such as a prism or diffraction grating, and focusing elements that operate to focus radiation dispersed by wavelength into one or more light pipes. In general, module 150 may include more radiation ports than are used to make measurements for any single sample fluid type which may be gas or liquid. As shown, radiation ports 131, 132, and 133 correspond with and couple to transparent regions 121, 122, and 123 of cartridge 101. This arrangement may for example be suitable for a first sample fluid type. For a second sample fluid type (not shown), a different combination of radiation ports may be used, for example 131, 134 and 135. The cartridge for the second sample fluid would have transparent regions corresponding to radiation ports 131, 134, and 135.

Radiation emitted by port 131 is shown to enter cartridge 101 at 121 and trace a zigzag path 131P to transparent region 129 in contact with detector means 139. In some embodiments the zigzag path may correspond to the path shown in the AMAS patent by the current inventors. In some embodiments, the cartridge further includes electrical connections (not shown) which enable generation of temporally varying electric fields within the sample as described in the MDS patent by the current inventors. Detector means 139 is in communication with control means 110. As shown, a reflective surface 128 is positioned at a location intermediate between the cartridge top with transparent port 121 and the cartridge bottom surface indicated at 102. In some embodiments reflective surface 128 may be attached to cartridge wall 125. In some embodiments reflective surface may be attached to upper surface 103 with one or more rigid spacers (not shown). This embodiment may be used to provide a consistent set of optical paths for a plurality of container types with different characteristic dimensions. In an alternative embodiment, the optical path may include bottom surface 102.

Module 150 may have fixtures 160 that mate with cartridge regions 161 and serve to rigidly join module 150 with cartridge 101 with radiation ports of the module aligned with transparent regions of the cartridge. Fixtures 160 may for example include hooks that reversibly link with cartridge features. Preferably the fixtures are arranged such that linkage between module 150 and cartridge 101 is possible in only one orientation.

Module 150 may contain a reading means 156 operable to read information encoded on cartridge 101 at 126. The information 126 may be encoded for example as an optical pattern. The information 126 may be encoded for example as a pattern of electrically conductive and non-conductive regions. The encoded information may for example include information about the sample fluid (composition, date, lot, etc.), optical configuration of the cartridge, and types of measurements supported.

Module 150 may contain thermal control means 159 that is brought into good thermal contact with cartridge 101 proximate to the measurement region. The thermal control means may include a temperature sensor, a heating element and a cooling element illustrated separately in FIG. 1. Temperature control means is in communication with control means 110.

As shown, module 150 includes integral display means 116 and input means 117 in communication with control means 110. In some embodiments, control means 110 may communicate (using a cable or wireless link) with external display means and input means.

The invention claimed is:

1. A method for measuring optical properties of a sample fluid to obtain at least one property of the sample fluid, the method comprising:

adding a volume of a sample fluid to an enclosure;

directing a plurality of electromagnetic radiation wavebands of wavelengths through the volume of sample fluid within the enclosure to generate an interaction radiation for each waveband;

wherein at least one of the plurality of wavebands has different wavelengths from at least one other of the wavebands;

wherein at least one of the wavebands of the plurality of wavebands is directed along a different path from others of the plurality of wavebands;

measuring the amplitude of each interaction radiation at a common measurement device;

statistically analyzing the interaction radiation amplitudes to obtain at least one property of the sample fluid;

wherein at least two different paths of the plurality of paths have different path lengths and wherein the path lengths for each wavelength are selected to minimize the difference in measured signals amplitudes.

2. The method according to claim 1 wherein the path lengths for each wavelength are selected such that the absorption is between 0.1 and 1.0 absorbance units.

3. The method according to claim 1 wherein the amplitudes of interaction radiations for a plurality of wavebands are measured at a plurality of predetermined temperatures and the statistical analysis includes at least one interaction radiation amplitude for each temperature.

4. The method according to claim 1 wherein there is provided at least one reflective surface and the path for at least one waveband includes at least one reflection from said reflective surface and wherein said at least one reflective surface is shaped to focus paths for a plurality of different wavebands to the common measurement device.

5. The method according to claim 1 wherein the enclosure is defined as a cartridge with a plurality of optical interfaces where the cartridge mates with a separate measurement module containing components for effecting the measurement steps.

6. The method according to claim 1 wherein there is provided an interface on a packaging material for passage of radiation between the volume and analyzer components.

7. The method according to claim 1 wherein the volume is an element of a microfluidic network.

8. The method according to claim 1 wherein measurements for wavebands corresponding to a plurality of radiation ports are multiplexed and the amplitudes of the wavebands are calculated by solving a system of equations.

9. The method according to claim 1 wherein the sample fluid is derived from a fruit juice.

10. The method according to claim 1 wherein at least one measurement is made during a production process.

11. The method according to claim 1 wherein at least one measurement of microbial presence in a sample fluid is made.

12. A method for measuring optical properties of a sample fluid to obtain at least one property of the sample fluid, the method comprising:

adding a volume of a sample fluid to an enclosure;

directing a plurality of electromagnetic radiation wavebands of wavelengths through the volume of sample fluid within the enclosure to generate an interaction radiation for each waveband;

wherein at least one of the plurality of wavebands has different wavelengths from at least one other of the wavebands;

wherein at least one of the wavebands of the plurality of wavebands is directed along a different path from others of the plurality of wavebands;

measuring the amplitude of each interaction radiation;

statistically analyzing the interaction radiation amplitudes to obtain at least one property of the sample fluid;

wherein at least two different paths of the plurality of paths have different path lengths;

wherein at least one of the plurality of wavebands is linearly or circularly polarized and the amplitude measurement includes a polarization analyzer.

13. A method for measuring optical properties of a sample fluid to obtain at least one property of the sample fluid, the method comprising:

adding a volume of a sample fluid to an enclosure;

directing a plurality of electromagnetic radiation wavebands of wavelengths through the volume of sample fluid within the enclosure to generate an interaction radiation for each waveband;

wherein at least one of the plurality of wavebands has different wavelengths from at least one other of the wavebands;

wherein at least one of the wavebands of the plurality of wavebands is directed along a different path from others of the plurality of wavebands;

measuring the amplitude of each interaction radiation;

statistically analyzing the interaction radiation amplitudes to obtain at least one property of the sample fluid;

wherein at least two different paths of the plurality of paths have different path lengths;

wherein the amplitudes of interaction radiations for a plurality of wavebands are measured at a plurality of predetermined levels of sample fluid within a sample volume and the statistical analysis includes at least one interaction radiation amplitude for each level of sample fluid and wherein subsequent to measuring the amplitudes of interaction radiation for a first level of sample fluid to give a second level of sample fluid and at least one interaction radiation is measured for said second level of sample fluid, and wherein for each waveband the path length between the said first and second levels of sample fluid correspond to different path lengths through the sample fluid.

14. A method for measuring optical properties of a sample fluid to obtain at least one property of the sample fluid, the method comprising:

adding a volume of a sample fluid to an enclosure;

directing a plurality of electromagnetic radiation wavebands of wavelengths through the volume of sample fluid within the enclosure to generate an interaction radiation for each waveband;

wherein at least one of the plurality of wavebands has different wavelengths from at least one other of the wavebands;

wherein at least one of the wavebands of the plurality of wavebands is directed along a different path from others of the plurality of wavebands;

measuring the amplitude of each interaction radiation;

statistically analyzing the interaction radiation amplitudes to obtain at least one property of the sample fluid;

wherein at least two different paths of the plurality of paths have different path lengths;

wherein a device to measure a level of sample fluid in the enclosure is included and the path lengths are calculated based on the measured level which is included in the statistical analysis.

15. A method for measuring optical properties of a sample fluid to obtain at least one property of the sample fluid, the method comprising:

adding a volume of a sample fluid to an enclosure;

directing a plurality of electromagnetic radiation wavebands of wavelengths through the volume of sample fluid within the enclosure to generate an interaction radiation for each waveband;

wherein at least one of the plurality of wavebands has different wavelengths from at least one other of the wavebands;

wherein at least one of the wavebands of the plurality of wavebands is directed along a different path from others of the plurality of wavebands;

measuring the amplitude of each interaction radiation;

statistically analyzing the interaction radiation amplitudes to obtain at least one property of the sample fluid;

wherein at least two different paths of the plurality of paths have different path lengths;

wherein at least one surface bounding the enclosure is reflective and the path for at least one waveband includes at least one reflection from said reflective surface;

and wherein said at least one reflective surface includes a material that enhances Raman scattering for at least one mode of a molecule expected to be present in the sample fluid.

16. The method according to claim 15 wherein said at least one reflective surface includes a first reflective surface of the enclosure opposes a second reflecting surface of the enclosure and the path for at least one waveband includes at least one reflection from each of said first and second reflecting surfaces.

17. The method according to claim 15 wherein the reflective surface is curved to at least partially collimate electromagnetic radiation.

18. The method according to claim 15 wherein the interaction radiation is Raman scattered radiation and wherein a device is included to analyze each Raman interaction radiation by wavelength to produce a Raman spectrum and wherein the Raman spectrum is included in the statistical analysis to infer at least one property of the sample fluid.

19. A method for measuring optical properties of a sample fluid to obtain at least one property of the sample fluid, the method comprising adding a volume of a sample fluid to an enclosure;

directing a plurality of electromagnetic radiation wavebands of wavelengths through the volume of sample fluid within the enclosure to generate an interaction radiation for each waveband;

wherein at least one of the plurality of wavebands has different wavelengths from at least one other of the wavebands;

wherein at least one of the wavebands of the plurality of wavebands is directed along a different path from others of the plurality of wavebands;

measuring the amplitude of each interaction radiation;

statistically analyzing the interaction radiation amplitudes to obtain at least one property of the sample fluid;

wherein at least two different paths of the plurality of paths have different path lengths;

wherein there is provided an optical adapter that matches the refractive index of transparent packaging material.

* * * * *